United States Patent Office 3,068,208
Patented Dec. 11, 1962

3,068,208
POLYUREA-POLYESTER RESINS
John M. Butler and Lee A. Miller, Dayton, and George L. Wesp, Englewood, Ohio, assignors to Monsanto Chemical Company, St. Louis, Mo., a corporation of Delaware
No Drawing. Filed Sept. 9, 1960, Ser. No. 54,815
18 Claims. (Cl. 260—77.5)

This invention relates to nitrogenous synthetic resins and more particularly provides polyurea-polyester resins containing a plurality of olefinic double bonds and amido or thio-amido ether linkages, which resins are useful in the plastics, coatings and laminate industries. The invention also provides a method of preparing the new polymers by the addition polymerization of certain acetylenic diesters with certain urea compounds. The invention also provides new and valuable cross-linked copolymers of the presently provided addition polymers.

In the copending application Serial No. 38,113 filed June 23, 1960, by Lee A. Miller and John M. Butler, there are disclosed and claimed the diesters of certain diols and certain acetylenic acids, i.e., compounds of the formula

in which Z is selected from the class consisting of hydrogen, alkyl radicals of from 1 to 5 carbon atoms and aryl radicals of 6 to 10 carbon atoms and R is selected from the class consisting of bivalent hydrocarbon radicals and bivalent halohydrocarbon radicals of from 2 to 18 carbon atoms and is linked through diverse carbon atoms thereof to the remainder of the molecule of which it forms a part. Now we have found that said diesters are eminently suited to the manufacture of high molecular weight, polymeric materials by an addition reaction thereof with a urea compound of the formula

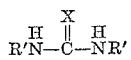

where X is selected from the class consisting of oxygen and sulfur and R' is an alkyl radical of from 1 to 5 carbon atoms. Compounds of this formula are either 1,3-dialkylureas or 1,3-dialkyl-2-thioureas having from 1 to 5 carbon atoms in each alkyl radical. Hereinafter, for the sake of convenience, they will be referred to simply as dialkyl urea compounds.

Reaction of said urea compounds to give the presently provided polymers proceeds by addition of the N-alkylamino group across an acetylenic bond of the diester, thus:

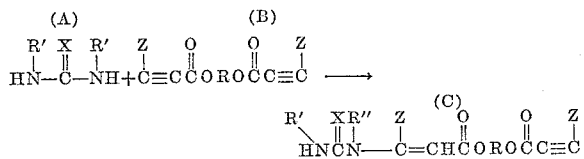

(C) may react with another mole of (C) or with (A) or (B) to extend the chain. The growing chain may react with (A) or (B) or with other growing chains of suitable reactivity. There are thus formed macromolecules having the repeating unit

Owing to the addition mechanism, the polymers are formed without evolution of volatiles or other obtained side-reaction products. As will be noted, the repeating unit is the addition product of one mole of the diester ZC≡CC(O)ORO(O)CC≡CZ and one mole of the urea compound R'HNC(X)NHR'. Hence, when the two reactants are employed in equimolar proportions and the reaction is carried to completion, there is obtained as product a high molecular weight polymer which is free not only of unreacted material but also of by-product.

Acetylenic diesters which are suitable for use in the present process are esters of dihydroxy compounds of the formula HO—R—OH where R is selected from the class consisting of bivalent hydrocarbon radicals and bivalent halohydrocarbon radicals of from 2 to 18 carbon atoms and is linked through diverse carbon atoms thereof to the two hydroxy groups, and of acetylenic carboxylic acids of the formula ZC≡CCOOH where Z is selected from the class consisting of hydrogen, alkyl radicals of from 1 to 5 carbon atoms and aryl radicals of 6 to 10 carbon atoms. As disclosed in the copending application of Miller and Butler referred to above, the diesters are prepared by esterification of the dihydroxy compound with either the free acetylenic acid or the acyl halide or anhydride thereof. Use of temperatures below 120° C. and operation in the presence of a diluent are recommended.

The dihydroxy compounds which are used for the preparation of the diesters that are employed in the present invention may be aliphatic, cycloaliphatic, aromatic, or aliphatic-aromatic, and they may be saturated or unsaturated. Thus, as examples of dihydroxy compounds which give acetylenic diesters of present utility are the aliphatic diols, e.g., ethylene glycol, 1,2- or 1,3-propanediol, 1,2-, 1,3-, 1,4- or 2,3-butanediol, 1,3-, 1,4- 1,5-, 2,3-, or 2,4-pentanediol, 2-butene-1,4-diol, 3-butene-1,2-diol, 2-bromo-1,3-propanediol, 2-fluoro-1,3-propanediol, 2-butyne-1,4-diol, 2-methyl-1,5-pentanediol, 1,4-dichloro-2,3-butanediol, 2,3-dibromo-1,4-butanediol, 2- or 4-chloro-1,3-butanediol, 2,4-dimethyl-2,4-pentanediol, 1,1,1-trifluoro-2,3-butanediol, 2,2-diethyl-1,4-butanediol, 2-pentyn-1,4-diol, 2-pentene-1,5-diol, 2-propyl-1,3-butanediol, 2-chloro-1,5-pentanediol, 5-iodo-1,4-butanediol, 1,4-hexanediol, 5-methyl-1,2-hexanediol, 2-ethyl-1,3-hexanediol, 2-tert-butyl-3,3,4,4-tetramethyl-1,2-pentanediol, 4-methyl-1,4-hexanediol, 1,6-hexanediol, 3,3-dimethyl-1,6-hexanediol, 2,4-dimethyl-3-hexene-2,5-diol, 2,3-, 2,4-, 2,5-, or 3,4-hexanediol, 1-chloro-2,5-dimethyl - 3 - hexyne-2,5-diol, 1,2,3,6-hexanetetrol, 2,4-hexadiyne-1,6-diol, 1,6-, 1,7-, 2,4-, 2,5-, or 1,4-heptenediol, 2-heptene-1,6-diol, 1-chloro-2,5-dimethyl-3-heptyne-2,5-diol, 5-ethyl-3-methyl-2,4-heptanediol, 1,2-, 1, 3-, 1,4-, 1,8-, 2,4-, 2,7-, or 4,5-octanediol, 2-methyl-2-octene-1,4-diol, 2,4,4,5,5,7-hexamethyl-3,6-octanediol, 2,7-dimethyl-4-octene-2,7-diol, 2-butyl-4-ethyl-3-methyl-1,3-octanediol, (3-heptafluoropropyl)-1,5-pentanediol, 1,9-nonanediol, 1,2- or 1,10-decanediol, 1,2- or 1,12-dodecanediol, 5-decyne-4,7-diol, 5,9-dimethyl-8-decene-1,5-diol, 5,8-diethyl-6,7-dodecanediol, 9-octadecene-1,12-diol, 9,10- or 1,12-octadecanediol, 1,9- or 1,11-undecanediol; 1,13-tridecanediol; 1,2-tetradecanediol, 1,2- or 1,16-hexadecanediol, 16-methyl-1,2-heptadecanediol, 1,2- or 1,12-octadecanediol, 2-methyl-1,2-propanediol, 2-butyl-2-ethyl-1,3-propanediol, 2,2-diethyl-1,3-propanediol, propanediol, 2-isobutyl-1,3-propanediol, 2-ethyl-1,3-butanediol, 2,2-diethyl-1,4-butanediol, 2,2,3,3-tetramethyl-1,4-butanedol, etc.

Examples of the benzenoid diols which are useful for esterification with the acetylenic acid, halide or anhydride to give presently useful diesters are o, m, or p-xylene-α,α'-diols, 3,6-dimethyl-o-xylene-α,α'-diol, α,α'-dimethyl-p-xylene-α,α'-diol, 1,6-diphenyl-1,6-hexanediol, 1,2-diphenyl-1, 2-ethanediol, 1- or 2-phenyl-1,2-propanediol, 2-methyl-1-phenyl-1,2-propanediol, 2-di-o-tolylmethyl-1,3-propanediol, 2-methyl-3-phenyl-1,2-butanediol, 1,4- or 2,2-diphenyl-1,4-butanediol, 2,3-dimethyl-1,4-diphenyl-1,4-butanediol, 1,6- or 1,8-naphthalenedimethanol, α-, α³-mesitylenediol, o-benzenediethanol, α,α'-dimethylhydrobenzoin, 2,3-dibenzylidene-1,4-butanediol, 1,1-bis(p-bromophenyl)-2-butyne-1,4-diol, 1-phenyl-1,5-pentanediol, hydroquinone, resorcinol, 2,6-dichlororesorcinol, pyrocatechol, 4-tert-butyl-5-chloropyrocatechol, 4-dodecylpyrocatechol, p,p'-biphenol, 4,4'-dichloro-o,o'-biphenol, 2,2',6,6'-tetraisopropyl-p,p'-biphenol, 1,8 or 1,2-naphthalenediol; 2-bromo-3-methyl-1,4-naphthalenediol, 4,4''-p-terphenyldiol, etc.

Alicyclic diols useful for the preparation of the presently employed acetylenic diesters are, for example, cyclohexyl-1,2-ethanediol, (1-cyclohexyl)-1,2-ethanediol, 1-cyclohexyl-2-methyl-1-phenyl-1,3-propanediol, 5-cyclohexyl-2-methyl-2,3-pentanediol, 1,2-, 1,3- or 1,4-cyclohexanediol, 4-cyclopentyl-1,2-cyclohexanediol, 1,2-dimethyl-1,2-cyclohexanediol, 1,1-cyclopropanedimethanol, 1,2,2,3,5,5-hexamethyl-1,3-cyclohexanediol, 2-cyclohexyl-1,4-cyclohexanediol, p,p'-bicyclohexanol, 1,1 or 1,2-cyclopentane dimethanol, 3,4-dichloro-1,2-cyclopentanediol, 3-cyclopentene-1,2-diol, 1,2-dimethyl - 1,2 - cyclopentanediol, decahydro-2,7-naphthalenediol, decahydro - 2,3-naphthalenedimethanol, (bicyclohexyl)-1,1'-dimethanol, 4-cyclohexylresorcinol, 3,6-dibromo-4-cyclohexane-1,2-diol, 4,5-dimethyl-4-cyclohexene-1,2-dimethanol, etc.

The acetylenic acids which are reacted with the polyols to give the presently useful acetylenic diesters may be 1-alkynoic acids of from 3 to 8 carbons atoms or arylpropiolic acids of from 9 to 13 carbon atoms. Acyl halides or anhydrides of such acetylinc acids may be used instead of the acids. The following are some examples of acetylenic acid compounds which are reacted with the above described diols to give esters of use in the present invention: propiolic acid, propiolyl chloride, bromide, iodide or fluoride, propiolic anhydride, tetrolic acid, 2-pentynoic acid, 2-hexynoic acid, 2-heptynoic acid, 2-octynoic acid, 2-octynoyl chloride, trimethyltetrolic acid, phenylpropiolic acid, phenylpropiolyl chloride, 2,3,4,6-tetramethylphenylpropiolic acid, o-, m-, or p-tolylpropiolic acid, 1-naphthalenepropiolic acid, p-phenylpropiolic acid, etc.

The propiolyl halide which may be used as one of the reactants of the esterification reaction may be prepared by reacting propiolic acid with benzoyl halide, as disclosed in the copending application of Lee A. Miller, Serial No. 6,344, filed February 3, 1960. The propiolyl chloride so formed may be led directly, without intermediate recovery, into a solution or suspension of the diol which is to be esterified for preparation of the presently employed acetylenic diesters.

Some examples of the acetylenic diesters which are useful for the preparation of the presently provided high molecular weight polymers are given below:

3-butene-1,4-diol dipropiolate
Ethylene glycol ditetrolate
2,3-dimethyl-1,3-pentanediol di-2-pentynoate
Propylene glycol dipropiolate
2-methyl-1,5-pentanediol bis(phenylpropiolate)
2-heptene-1,6-diol dipropiolate
1,6-methyl-1,2-heptadecanediol 2-pentynoate
Hydroquinone dipropiolate
o-Benzenediethanol bis(phenylpropiolate)
1-phenyl-1,2-propanediol dipropiolate
4,4-dichloro-o,o'-biphenol dipropiolate
p,p'-Dicyclohexanol dipropiolate
1,2-cyclopentanediol bis(phenylpropiolate)
4-cyclohexene-1,2-dimethanol di-2-pentynoate
1,1-cyclopropanedimethanol dipropiolate
Cyclohexane-1,2-ethanediol bis(phenylpropiolate)
3-cyclopentene-1,2-diol bis(1-naphthalenepropiolate)
Decahydro-2,3-naphthalenedimethanol dipropiolate
2-methyl-1,2-propanediol dipropiolate
2-methyl-2-octene-1,4-diol dipropiolate
1,6-hexanediol bis(4-tolylpropiolate)

The urea compounds which are used with the above described acetylenic diesters to give the presently provided polymers have the formula

where R is an alkyl radical of from 1 to 5 carbon atoms and X is selected from the class consisting of oxygen and sulfur.

Examples of the presently useful urea compounds are 1,3-dimethylurea, 1,3-diethylurea, 1,3-di-n-propylurea, 1,3-diisopropylurea, 1-ethyl-3-methylurea, 1,3-di-n-butylurea, 1,3-di-tert-butylurea, 1,3-diisobutylurea, 1,3-di-n-amylurea, 1,3-di-tert-amylurea, 1,3-diisoamylurea, 1,3-dimethyl-2-thiourea, 1,3-diethyl-2-thiourea, 1,3-diisopropyl-2-thiourea, 1,3-di-n-propylthiourea, 1-n-butyl-3-ethyl-2-thiourea, 1,3-di-n-butyl-2-thiourea, 1,3-di-tert-butyl-2-thiourea, 1,3-di-n-amyl-2-thiourea, 1,3-diisoamyl-2-thiourea, etc.

Reaction of the acetylenic diester with the urea or thiourea compound is generally conducted in the presence of a catalyst and in the presence of an inert liquid diluent or solvent. Examples of suitable diluents are dioxane, benzene, xylene, hexane, carbon tetrachloride, tert-butanol, etc. Preferably, the basic catalyst is an organic basic material. This is particularly desirable when the reaction is effected in the presence of a diluent. Examples of presently useful basic catalysts are, e.g., the heterocyclic nitrogen bases such as N-methylmorpholine, pyridine, quinoline, N-ethylpiperidine, picoline, quinaldine, 4-methylpyrimidine, or N-phenylpyrazole; the tertiary amines such as triethylamine, triamylamine, tri-tert-butylamine, N,N-dimethylaniline and N-benzyl-N-methylaniline; alkylene polyamines such as triethylenediamine; quaternary ammonium compounds such as benzyltrimethylammonium methoxide or tetrabutylammonium butoxide; and alkali metal alkoxides such as sodium or potassium methoxide or propoxide, etc. Usually, compounds having tertiary nitrogen atoms are most satisfactory. The use of a diluent or solvent in the reaction will depend upon the nature of the reactants as well as upon the reaction conditions which are employed. When using a solid acetylenic diester it is generally recommended that a diluent be employed; on the other hand, when the acetylenic diester is a liquid at the reaction temperature a diluent need not be used unless the ester and/or the urea compound is extremely reactive. In that case, the use of an inert diluent will serve to moderate the reaction. The reactivity of the acetylenic ester is usually a function of the molecular weight of the ester, the dipropiolates of the lower molecular weight glycols being most reactive. On the other hand, reactivity of the urea compound depends to an extent upon whether there is employed a dialkylurea or a dialkylthiourea and upon the length of the alkyl chain. Generally, the lower alkyl compounds are more reactive, and usually the thiourea derivatives are more reactive than the urea derivatives. The quantity of the catalyst to be used also depends upon the nature of the acetylenic ester and of the urea compound; obviously the more reactive reactants will require less catalyst than will the more sluggish reactants. Whether or not a diluent is used will likewise regulate catalyst quantity. Also variable is the temperature at which reaction is effected; for here again must be taken into consideration the nature of the reactants and use of diluent and catalyst quantity. While some of the present addition polymerizations can be conducted at ordinary room temperature or even at decreased temperatures, say, at —10° C. to 10° C., in other instances heating of the reaction mixture will be needed. All of these variables, i.e., catalyst quantity, use of diluent and temperature conditions can readily be arrived at by easy experimentation. Since reaction is generally evidenced by evolution of heat and a change in viscosity, whether or not one or both of such phenomena occur will be indicative of reaction. Very rapid reaction at room temperature, as evidenced by rapid temperature rise, will show the need for a diluent and/or lower temperature and/or less catalyst. Conversely, no reaction or only a very slow reaction at room temperature will indicate the use of more extreme conditions, i.e., extraneous heating and/or no diluent and/or more catalyst. Thus, arrival at optimum reaction conditions is simply a matter of routine procedure by one skilled in the art. To assure complete reaction in experimental runs it is generally recommended that the reaction mixture be allowed to stand for some time after the primary, generally exothermic reaction has subsided. Completion of the reaction can then be ascertained by simply noting cessation in change of viscosity.

When the addition polymerization has been effected in the absence of a solvent or diluent, generally no further treatment of the product is required previous to its use, say, as a plasticizer, molding resin, or impregnant. When the reaction is effected in the presence of a diluent which is a non-solvent for the polymer, the precipitated resinous product is simply filtered off, washed and dried. When the reaction is conducted in a liquid which is a solvent for the polymer, the latter is separated from the reaction mixture by mixing with a liquid which is a non-solvent for the polymer. The precipitate or coagulate thus formed consists essentially of the polymer. The coagulates are then filtered off and washed and dried to give the resinous polyurea-polyester. However, solutions of the polymer need not be coagulated to give useful products; for many purposes the solutions per se may be used directly, e.g., as bonding adhesives and as impregnating agents. The solutions may also be used for conversion of the soluble, linear polyurea-polyester content thereof into insoluble, cross-linked resins.

To recapitulated: In the preparation of the present polyesters, the acetylenic diester is reacted with the urea compound in the presence of a catalyst and in the presence or absence of an inert diluent or solvent at a temperature which may be as low as, say, $-10°$ C. and as high as, say, $125°$ C., and the resulting mixture is allowed to stand until a very high molecular weight polyurea-polyester is achieved. The acetylenic ester and the urea compound are employed in substantially stoichiometric proportions in order to avoid need of separating unreacted material. Depending upon the individual reactants and catalyst and upon whether or not a diluent is used, extraneous heating may or may not be employed; but when it is used, the mixture is heated up gradually, say, at a rate of 1 to $5°$ C. per minute to a temperature which may be up to $125°$ C. but is more generally from $70°$ C to $90°$ C. Also, depending upon the nature of the individual reactants, the quantities thereof and the reaction conditions, completion of the reaction as noted by no further change in viscosity, is obtained within a time that will range from, say, a few minutes to several days. Whether or not a linear polymer is obtained and the molecular weight of the polymer will depend to some extent on the proportion of reactants employed. The high molecular weight, linear polyurea-polyester is generally obtained when the urea compound and the acetylenic ester are used in substantially equimolar proportions. A substantial excess of the urea compound may result in cross-linking of the initially formed linear polymer by addition of the urea compound across the olefinic double bonds of the linear polymer.

Alternative procedures may involve the use of a mixture of two or more acetylenic esters, for example, a mixture of the dipropiolate of ethylene glycol and the bis-(phenyl-propiolate) of 4,4'-isopropylidenediphenol. Likewise there may be used a mixture of two different dialkylureas or dialkylthioureas or of a dialkylurea and a dialkylthiourea to obtain polymers having various linkages dispersed more or less randomly in the polymer chain.

The presently provided polyurea-polyesters range from clear, viscous liquids to transparent solids. As will be shown hereinafter, the viscous liquids can be reacted with polyfunctional compounds to give high melting, solvent-resistant resins. Of particular importance, however, are those of the presently provided polymers which are solid resinous materials, per se, i.e., without subsequent curing treatment.

Such products are readily compression molded with heating to give molded objects which are tough, transparent and of good dimensional stability. The polymers may also be cast into films from solutions thereof or fibers may be prepared therefrom by extruding through a suitable orifice into a precipitating bath. Solutions of the solid polymers or the viscous polymers which are obtainable under some conditions by incomplete polymerization are useful as impregnating agents and adhesives in the manufacture of laminates. Either the solid or viscous polymers are also advantageously employed in resinous base coatings, i.e., paints, varnishes, lacquers and enamels. The viscous polymers or solutions of the linear polymers are also useful in the manufacture of tiles, linoleums, wallboards, etc. by mixing them with comminuted matter, such as ground cork, wood flour, asbestos, mineral fillers or the like and either completing the polymerization or evaporating the solvent or diluent. The cross-linked gels as well as the presently provided viscous polymers are likewise useful as potting compounds and sealants. An especially interesting utility of the present polymers, particularly of the gels, is in the formulation of solid or semi-solid propellant fuels for rockets and other self-guided missiles.

Those of the linear polyesters which are not solid, resinous materials can be treated with a curing or cross-linking agent to give tough, substantially infusible and insoluble products. Thus, they can be cured with sulfur or other vulcanizing agents, e.g., para-quinone dioxime or para-dinitrosobenzene to give rubbers. When heated with compounds having activated carbon atoms and/or active hydrogen atoms in the presence or absence of condensing or polymerizing catalysts there are obtained cross-linked polyesters which are hard and tough and which are very resistant to attack by heat and solvents.

Compounds reactive under curing conditions with the presently provided polyurea-polyesters to give tough, cross-linked resins are, for example, compounds containing a vinyl ($CH_2$:CH—) radical and copolymerizable with the linear polyesters such as styrene, vinyl acetate, vinyl chloride and methyl vinyl ketone; and alkenyl esters of $\alpha,\beta$-unsaturated dicarboxy acids such as allyl fumarate or maleate.

The cross-linked polymers obtained by heating the present linear polyesters with a mono-vinyl aromatic compound or mixtures of such compounds under curing conditions, e.g., in the presence of a catalyst of polymerization, are of exceptional interest in that they comprise valuable resinous materials of high utility in the preparation of moldings, castings, laminates, fibers and surface-coatings. Presently useful polymerization catalysts are, e.g., peroxidic compounds such as benzoyl peroxide, tert-butyl hydroperoxide, cumene hydroperoxide, or potassium persulfate or azo compounds such as $\alpha,\alpha'$-azobisisobutyronitrile, etc. Moldings and castings formed from such cross-linked polymers are transparent, substantially colorless, tough products which are characterized by good dimensional stability and resistance to heat and moisture. Monovinyl aromatic compounds useful for the preparation of the cross-linked polyesters are compounds in which one vinyl group is attached to a carbon atom of a benzene, biphenyl, naphthalene, fluorene or acenaphthene ring structure. The ring may contain other substituents such as chlorine, fluorine, alkoxy, alkyl, hydroxy, trichloromethyl, trifluoromethyl or acetyl. The vinyl group may or may not be substituted. As illustrative of compounds included within the scope of monovinyl aromatic compounds may be mentioned styrene, $\alpha$-methylstyrene, 3,4-dichlorostyrene, 4-fluorostyrene, $\alpha$-chlorostyrene, 4-vinyltoluene, 3-(trifluoromethyl)styrene, 4-vinylanisole, 4-vinylacetophenone, $\alpha$-vinylnaphthalene, 4-vinylbiphenyl, 3-vinylfluorene, 2-vinylacenaphthene, etc.

The invention is further illustrated by, but not limited to the following examples:

*Example 1*

To a mixture consisting of 0.8811 g. (0.01 mole) of 1,3-dimethylurea, 2.0821 g. (0.01 mole) of the dipropiolate of 2,2-dimethyl-1,3-propanediol and 8 ml. of dioxane which mixture had been prepared about 30 minutes previously and which still contained much undissolved dimethylurea at 25° C., there was added 0.0506 g. of N-methylmorpholine. Reaction as evidenced by change of color was noted within one minute. The whole was allowed to stand for 5.5 hours and then placed in an 80° C. oven and maintained there for 41.5 hours. At the end of that time there was obtained the firm, brown, gel-like solution of cross-linked polymeric urea-ester.

*Example 2*

To a mixture consisting of 2.0821 g. (0.01 mole) of the dipropiolate of 2,2-dimethyl-1,3-propanediol and 1.8834 g. (0.01 mole) of 1,3-dibutyl-2-thiourea there was added 7.0 ml. of sodium-purified dioxane; and to the resulting mixture there was added 1 ml. of catalyst solution which had been prepared by dissolving 0.5058 g. of triethylenediamine in 10 ml. of sodium-purified dioxane. There was a moderate exothermic reaction. After standing for one hour at room temperature, it was heated for 17 hours at 50° C. to give a soft, amber gel. This was taken up into 150 ml. of methanol, allowed to digest overnight, and washed with water. Upon filtration and drying of the solids there was obtained 2.48 g. (62.5% yield) of a tan, cross-linked polymer.

What we claim is:

1. A resinous composition comprising the addition polymer of an acetylenic diester of the formula

in which Z is selected from the class consisting of hydrogen, alkyl radicals of from 1 to 5 carbon atoms and aryl radicals of 6 to 10 carbon atoms and R is selected from the class consisting of bivalent hydrocarbon radicals and bivalent halohydrocarbon radicals of from 2 to 18 carbon atoms and is linked through diverse carbon atoms thereof to the remainder of the molecule of which it forms a part and a urea compound of the formula

in which R is an alkyl radical of from 1 to 5 carbon atoms and X is selected from the class consisting of oxygen and sulfur, said polymer having been prepared by contacting the diester with the urea compound in the presence of a basic catalyst.

2. A resinous composition comprising the addition polymer of the dipropiolate of a hydrocarbon diol, wherein the two hydroxy radicals are attached to diverse carbon atoms of a hydrocarbon radical having from 2 to 18 carbon atoms, and a 1,3-dialkylurea having from 1 to 5 carbon atoms in each alkyl radical, said polymer having been prepared by contacting the dipropiolate with a substantially equimolar proportion of the 1,3-dialkylurea in the presence of a basic catalyst.

3. A resinous composition comprising the addition polymer of the dipropiolate of a hydrocarbon diol, wherein the two hydroxy radicals are attached to diverse carbon atoms of a hydrocarbon radical having from 2 to 18 carbon atoms, and a 1,3-dialkyl-2-thiourea having from 1 to 5 carbon atoms in each alkyl radical, said polymer having been prepared by contacting the dipropiolate with a substantially equimolar proportion of the 1,3-dialkyl-2-thiourea in the presence of a basic catalyst.

4. A resinous composition comprising the addition polymer of the dipropiolate of an alkylene glycol having from 2 to 18 carbon atoms in the alkylene radical and a 1,3-dialkylurea having from 1 to 5 carbon atoms in the alkyl radical, said polymer having been prepared by contacting the dipropiolate with a substantially equimolar proportion of the 1,3-dialkylurea in the presence of a basic catalyst.

5. A resinous composition comprising the addition polymer of the dipropiolate of an alkylene glycol having from 2 to 18 carbon atoms in the alkylene radical and a 1,3-dialkylthiourea having from 1 to 5 carbon atoms in the alkyl radical, said polymer having been prepared by contacting the dipropiolate with a substantially equimolar proportion of the 1,3-dialkylthiourea in the presence of a basic catalyst.

6. A resinous composition comprising the addition polymer of 1,3-dimethylurea and the dipropiolate of 2,2-dimethyl-1,3-propanediol, said polymer having been prepared by contacting the dipropiolate with a substantially equimolar proportion of the 1,3-dimethylurea in the presence of a basic catalyst.

7. A resinous composition comprising the addition polymer of 1,3-dibutyl-2-thiourea and the dipropiolate of 2,2-dimethyl-1,3-propanediol, said polymer having been prepared by contacting the dipropiolate with a substantially equimolar proportion of the 1,3-dibutyl-2-thiourea in the presence of a basic catalyst.

8. The method of preparing a resinous composition which comprises contacting, in the presence of a basic catalyst, an acetylenic ester of the formula

in which Z is selected from the class consisting of hydrogen, alkyl radicals of from 1 to 5 carbon atoms and aryl radicals of 6 to 10 carbon atoms and R is selected from the class consisting of bivalent hydrocarbon radicals and bivalent halohydrocarbon radicals of from 2 to 18 carbon atoms and is linked through diverse carbon atoms thereof to the remainder of the molecule of which it forms a part with a urea compound of the formula

where R is an alkyl radical of from 1 to 5 carbon atoms and X is selected from the class consisting of oxygen and sulfur, and recovering an addition polymer of said acetylenic ester and said urea compound.

9. The method of preparing a resinous composition which comprises contacting, in the presence of a basic catalyst and an inert liquid diluent, an acetylenic ester of the formula

in which Z is selected from the class consisting of hydrogen, alkyl radicals of from 1 to 5 carbon atoms and aryl radicals of 6 to 10 carbon atoms and R is selected from the class consisting of bivalent hydrocarbon radicals and bivalent halohydrocarbon radicals of from 2 to 18 carbon atoms and is linked through diverse carbon atoms thereof to the remainder of the molecule of which it forms a part with a substantially equimolar proportion of a urea compound of the formula

where R is an alkyl radical of from 1 to 5 carbon atoms and X is selected from the class consisting of oxygen and sulfur, and recovering an addition polymer of said acetylenic ester and said urea compound.

10. The method of preparing a resinous composition which comprises contacting, at a temperature of from −10° C. to 125° C. and in the presence of a basic catalyst and an inert liquid diluent, an acetylenic ester of the formula

in which Z is selected from the class consisting of hydrogen, alkyl radicals of from 1 to 5 carbon atoms and aryl radicals of 6 to 10 carbon atoms and R is selected from the class consisting of bivalent hydrocarbon radicals and bivalent halohydrocarbon radicals of from 2 to 18 carbon atoms and is linked through diverse carbon atoms thereof to the remainder of the molecule of which it forms a part with a substantially equimolar proportion of a urea compound of the formula

where R is an alkyl radical of from 1 to 5 carbon atoms and X is selected from the class consisting of oxygen and sulfur, and recovering an addition polymer of said acetylenic ester and said urea compound.

11. The method of preparing a resinous composition which comprises contacting, at a temperature of from −10° C. to 125° C. and in the presence of a basic catalyst and an inert liquid diluent, the dipropiolate of a hydrocarbon diol wherein the two hydroxy radicals are attached to diverse carbon atoms of a hydrocarbon radical having from 2 to 18 carbon atoms with a substantially equimolar proportion of a 1,3-dialkylurea having from 1 to 5 carbon atoms in each alkyl radical and recovering from the resulting reaction product an addition polymer of said dipropiolate and said urea compound.

12. The method of preparing a resinous composition which comprises contacting, at a temperature of from −10° C. to 125° C. and in the presence of a basic catalyst and an inert liquid diluent, the dipropiolate of a hydrocarbon diol wherein the two hydroxy radicals are attached to diverse carbon atoms of a hydrocarbon radical having from 2 to 18 carbon atoms with a substantially equimolar proportion of a 1,3-dialkyl-2-thiourea having from 1 to 5 carbon atoms in each alkyl radical and recovering from the resulting reaction product an addition polymer of said dipropiolate and said urea compound.

13. The method of preparing a resinous composition which comprises contacting, at a temperature of from −10° C. to 125° C. and in the presence of a basic catalyst and an inert liquid diluent, the dipropiolate of an alkylene glycol having from 2 to 18 carbon atoms in the alkylene radical with a substantially equimolar proportion of a 1,3-dialkylurea having from 1 to 5 carbon atoms in each alkyl radical, and recovering from the resulting reaction product an addition polymer of said dipropiolate and said urea compound.

14. The method of preparing a resinous composition which comprises contacting, at a temperature of from −10° C. to 125° C. and in the presence of a basic catalyst and an inert liquid diluent, the dipropiolate of an alkylene glycol having from 2 to 18 carbon atoms in the alkylene radical with a substantially equimolar proportion of a 1,3-dialkyl-2-thiourea having from 1 to 5 carbon atoms in the alkyl radical and recovering from the resulting reaction product an addition polymer of said dipropiolate and said urea compound.

15. The method of preparing a resinous composition which comprises contacting, at a temperature of from −10° C. to 125° C. and in the presence of a basic catalyst and an inert liquid diluent, the dipropiolate of 2,2-dimethyl-1,3-propanediol with a substantially equimolar proportion of 1,3-dimethylurea, and recovering from the resulting reaction product the addition product of said dipropiolate and said dimethylurea.

16. The method of preparing a resinous composition which comprises contacting, at a temperature of from −10° C. to 125° C. and in the presence of a basic catalyst and an inert liquid diluent, the dipropiolate of 2,2-dimethyl-1,3-propanediol with a substantially equimolar proportion of 1,3-dibutyl-2-thiourea, and recovering from the resulting reaction product the addition product of said dipropiolate and said dibutylthiourea.

17. A tough, cross-linked synthetic resinous product prepared by heating the addition polymer of claim 1 with a compound containing a vinyl radical and copolymerizable with said addition polymer in the presence of a catalyst of polymerization.

18. A tough, cross-linked synthetic resinous product prepared by heating the addition polymer of claim 3 with a compound containing a vinyl radical and copolymerizable with said addition polymer in the presence of a catalyst of polymerization.

References Cited in the file of this patent
UNITED STATES PATENTS

| | | |
|---|---|---|
| 2,249,535 | Macallum | July 15, 1941 |
| 2,290,649 | Macallum | July 21, 1942 |
| 2,318,959 | Muskat | May 11, 1943 |

UNITED STATES PATENT OFFICE
CERTIFICATE OF CORRECTION

Patent No. 3,068,208            December 11, 1962

John M. Butler et al.

It is hereby certified that error appears in the above numbered patent requiring correction and that the said Letters Patent should read as corrected below.

Column 1, lines 24 to 25, the formula should appear as shown below instead of as in the patent:

column 2, line 59, for "butanedol" read -- butanediol --;
column 3, line 25, for "acetylinc" read -- acetylenic --.

Signed and sealed this 3rd day of September 1963.

(SEAL)
Attest:

ERNEST W. SWIDER            DAVID L. LADD
Attesting Officer            Commissioner of Patents